(12) United States Patent
Bold et al.

(10) Patent No.: US 9,058,510 B1
(45) Date of Patent: Jun. 16, 2015

(54) SYSTEM FOR AND METHOD OF CONTROLLING DISPLAY CHARACTERISTICS INCLUDING BRIGHTNESS AND CONTRAST

(75) Inventors: Peter H. Bold, Portland, OR (US); Weston J. Lahr, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 337 days.

(21) Appl. No.: 13/194,511

(22) Filed: Jul. 29, 2011

(51) Int. Cl.
G06G 5/00 (2006.01)
G06T 1/00 (2006.01)

(52) U.S. Cl.
CPC ... *G06G 5/00* (2013.01); *G06T 1/00* (2013.01)

(58) Field of Classification Search
CPC .............. G09G 2320/0247; G09G 2320/0261; G09G 2320/106; G09G 3/2096; G09G 5/008; G09G 5/397; G09G 5/399; G06T 2207/10016; G06T 5/009; G06T 5/40; G06T 5/05; H01L 27/14621; H01L 27/14645; H04N 21/4825; H04N 3/155; H04N 5/35518; H04N 7/0132; H04N 7/01
USPC .......................................... 345/598, 626, 629
See application file for complete search history.

(56) References Cited

U.S. PATENT DOCUMENTS

| | | | |
|---|---|---|---|
| 4,997,263 A | 3/1991 | Cohen et al. | |
| 5,629,784 A | 5/1997 | Abileah et al. | |
| 5,831,693 A | 11/1998 | McCartney et al. | |
| 6,195,206 B1* | 2/2001 | Yona et al. | 359/630 |
| 6,987,787 B1 | 1/2006 | Mick | |
| 7,312,779 B1 | 12/2007 | Blevins | |
| 7,839,379 B1* | 11/2010 | Kerr et al. | 345/102 |
| 2002/0149568 A1* | 10/2002 | Kim | 345/170 |
| 2003/0222998 A1* | 12/2003 | Yamauchi et al. | 348/262 |
| 2005/0111231 A1* | 5/2005 | Crodian et al. | 362/545 |
| 2006/0050018 A1* | 3/2006 | Hutzel et al. | 345/60 |
| 2006/0228024 A1* | 10/2006 | Franz et al. | 382/169 |
| 2009/0201177 A1* | 8/2009 | Soler | 340/974 |
| 2009/0213037 A1* | 8/2009 | Schon | 345/7 |
| 2011/0025702 A1* | 2/2011 | Lionti | 345/589 |
| 2011/0147570 A1* | 6/2011 | Drummond et al. | 250/214 AL |
| 2012/0098971 A1* | 4/2012 | Hansen et al. | 348/164 |

OTHER PUBLICATIONS

Office Action for U.S. Appl. No. 12/874,004, mail date Nov. 21, 2012, 12 pages.

* cited by examiner

*Primary Examiner* — Kimbinh T Nguyen
*Assistant Examiner* — Raffi Isanians
(74) *Attorney, Agent, or Firm* — Angel N. Gerdzhikov; Donna P. Suchy; Daniel M. Barbieri (57) ABSTRACT

A system and method for controlling display characteristics is disclosed. The system and method includes a memory and a processor coupled to the memory configured to execute instructions stored in the memory to detect video input from a sensor, receive a control signal from a user and use the input control signal to alter a level of pixel intensity in a video output. The system and method for controlling display characteristics also includes altering the video input into the video output according to an algorithm and displaying the video output signal with an altered level of pixel intensity.

18 Claims, 8 Drawing Sheets

SYSTEM FOR AND METHOD OF CONTROLLING DISPLAY CHARACTERISTICS INCLUDING BRIGHTNESS AND CONTRAST

BACKGROUND OF THE INVENTION

The present disclosure relates generally to the field of brightness and/or contrast control in display systems. More particularly, the present disclosure relates to optimization of the brightness and/or contrast of a display.

Displays are utilized in a wide variety of applications including but not limited to medical, military, avionic, entertainment and computing applications. In one exemplary application, displays are used in head-up display (HUD) systems and wearable displays, such as, helmet mounted display (HMD) systems. In aircraft applications, HUD and HMD systems advantageously allow the flight crew to maintain eye contact with the outside environment while simultaneously viewing information from aircraft systems and sensors in a graphical and alphanumeric format overlaying the outside world view. Head-up display systems are known to provide conformal information such that displayed features overlay the environmental view or display information from a camera or other imaging sensor (such as a visible light imaging sensor, infrared imaging sensor, millimeter wave radar imager, etc.) mounted on the aircraft.

For displayed video, a constant video contrast is not sufficient for displaying all video information while important incoming video content such as runway lighting is mapped to peak display brightness. Some conventional HUD systems provide two knobs that control video brightness and video contrast independently. Such video display control may not be optimal for all situations. For example, when enhanced vision images are used in the HUD system during low visibility approaches, video contrast and brightness need to be adjusted by the pilot such that the emerging sensed scene is displayed in a manner that clearly displays and distinguishes illuminated runway lights.

Under such conditions, the displayed image should be set to a maximum contrast and brightness ensuring that objects with a high degree of illumination such as runway lights are displayed with optimal pixel intensity while objects with a lesser degree of illumination such as fog are displayed with a lesser degree of pixel intensity. With a conventional two knob solution, this configuration results in both knobs being turned to full deflection. If a user such as a pilot desires to increase the average video brightness to bring more terrain data into view, the contrast knob may have to be adjusted so that the contrast is lower. Accordingly, a two knob system in many cases requires a non-intuitive combination of separate brightness and contrast control signals to achieve an optimum output display that may result in a prolonged period of user adjustment to both knobs. Prolonged user adjustments to a user interface during a critical phase of flight such as landing can lead to pilot error. Accordingly, there is a need for a system and method of providing an optimal degree of brightness and/or contrast with minimal adjustments from a user. There is also a need for a systems and methods of providing an optimal degree of brightness and contrast with minimal adjustments from a user. There is a further need for systems for and methods of controlling brightness and/or contrast without requiring a two knob interface. There is still a further need for systems for and methods of controlling brightness and contrast with a less complex user interface.

Furthermore, in many display applications, such as, in HUD systems for aircraft or land based vehicles or in medical imaging systems, text, lines, numbers or other symbology is often superimposed on video content being displayed. In the context of aircraft, the information displayed is typically data and/or symbolic images indicative of flight conditions such as altitude or airspeed and may also represent other information such as navigation or guidance information. The pixel intensity of symbology that is superimposed on video content is conventionally at maximum pixel intensity at all times. Further, the brightness of the display for both symbology and video content is typically controlled by a common backlighting system. However, in some cases it is desirable for symbology to be displayed at less than maximum brightness without having to turn down the common backlighting system. This is because turning down the common backlighting system can drop video content of objects (e.g. terrain) below a viewable threshold. Accordingly, there is a need for a system for and a method of providing a variable symbology brightness so that a user is able to clearly view video content while also altering the level of symbology brightness.

SUMMARY OF THE INVENTION

An exemplary embodiment relates to a method of controlling display content. The method includes receiving a control signal from a user interface. The method also includes providing the video output according to an algorithm using a processor and displaying the video output signal with an altered level of pixel intensity.

Another exemplary embodiment relates to a method of controlling display content. The method includes receiving a control signal from a user interface, and receiving a video input signal having a first pixel intensity associated with a first pixel. The method also includes providing a video output signal having a second pixel intensity for the first pixel. The second pixel intensity is selected according to a plurality of zones related to the control signal. The zones each have a different relationship between the first pixel intensity and the second pixel intensity. The method also includes displaying an image associated with the video output signal.

Another embodiment relates to an apparatus for controlling display content including a sensor configured to detect video input and a single user adjustable interface configured to receive an input control signal. The apparatus also includes a plurality of selectable algorithms, wherein one of the selectable linear algorithms is selected according to the input control signal to provide an altered level of pixel intensity for a video output signal.

Yet another embodiment relates to a HUD or HMD system including a single user adjustable interface configured to output a control signal and a processor configured to provide an adjusted pixel intensity for each of a plurality of pixels associated with a video input signal. The processor is also configured to adjust the pixel intensity in response to a relationship selected from amongst a plurality of selectable relationships associated with a zone, wherein the relationship is selected in response to the control signal.

BRIEF DESCRIPTION OF THE DRAWINGS

Exemplary embodiments are hereafter described, wherein like reference numerals denote like elements, and.

DETAILED DESCRIPTION OF THE PREFERRED EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Figure 1:
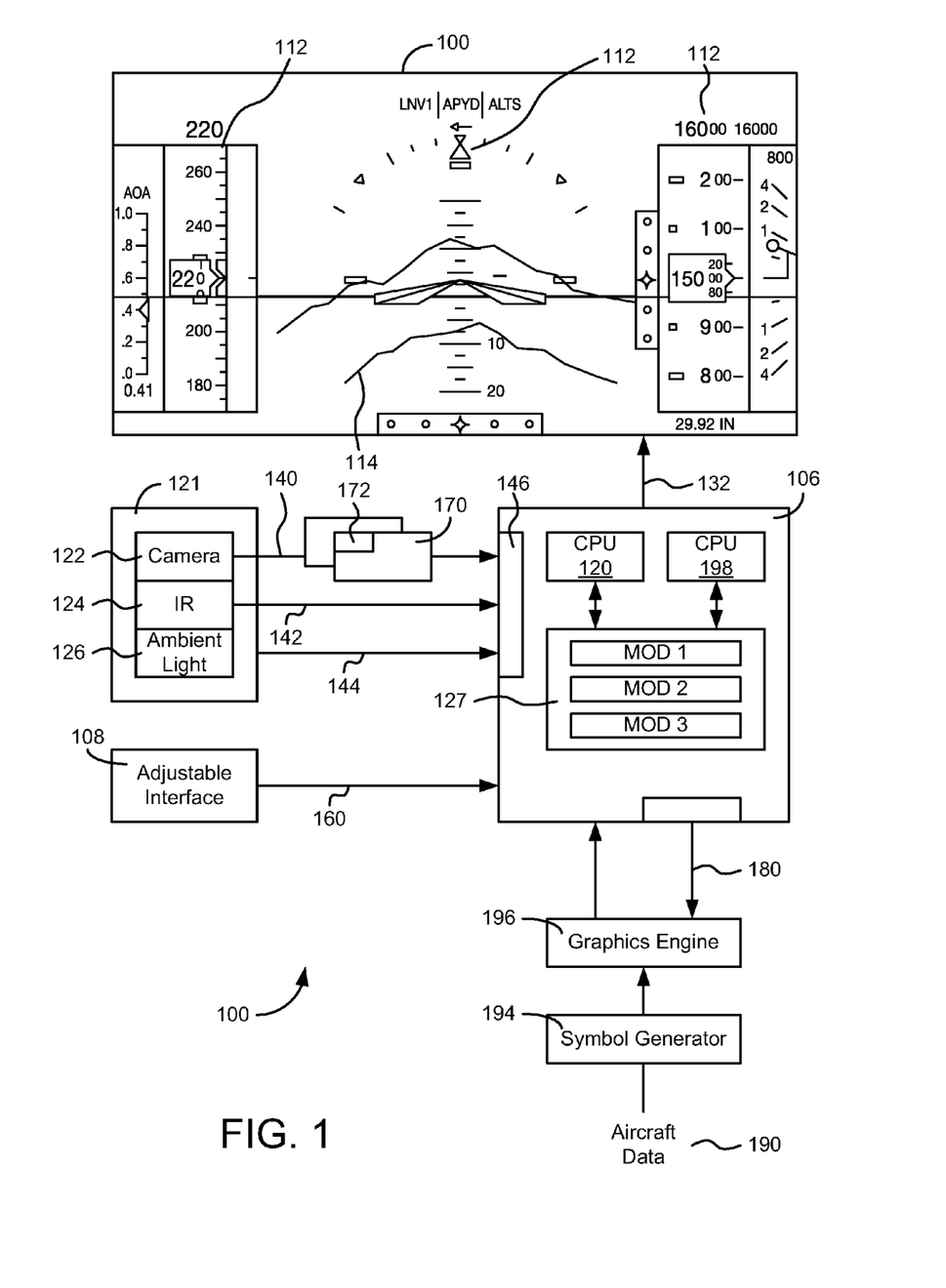
FIG. 1 is a general block diagram of one embodiment of a system for providing display content in accordance with an exemplary embodiment.

Referring to FIG. 1, a display system 100 is depicted. System 100 may be implemented in a wide variety of systems that accept input control signals to control display content in a display 110. For example, system 100 may be implemented in systems including but not limited to military targeting systems, medical imaging display systems, land based vehicle HUD, HMD, or head down display systems or aircraft HUD, HMD or head down display systems. Accordingly, display 110 may be any variety of pixilated displays, including, but not limited to a liquid crystal display (LCD). Further, display 110 may be a head-up or a head-down display although the disclosure describes primarily the use of display 110 in a head-up display configuration. System 100 can receive data 120 from a plurality of sources including, but not limited to sensors, inertial reference units, air data, terrain data, navigation receiver data, etc. For example, in FIG. 1, sensor input 121 can contain several sensor modules including but not limited to a video camera module, an infrared imaging sensor module or a millimeter wave radar sensor. In one exemplary embodiment, sensor input 121 can be mounted on the exterior of an aircraft to detect conditions such as terrain, weather conditions, the presence of other aircraft, altitude, speed or a runway path, for example.

Display computer 106 includes a processor 120 and memory 127 that may include any number of memory modules, for example mod1-mod3, which may correspond to the sensor modules 122, 124 and 126 associated with sensor input 121 or may store data associated with various processes needed for controlling display system 100. Display computer 106 can accept multiple sensor inputs 140, 142 and 144.

Inputs 140, 142 and 144 provide information to be used as display content for display 110. In one exemplary embodiment, inputs 140, 142 and 144 provide information to a HUD or other display 110. Processor 120 can be a hardwired circuit, a digital signal processor, video processor, an ASIC, a programmable logic device, etc., or a combination thereof. Preferably, processor 120 executes software instructions to perform the operations described herein.

Display 110 may include a projector, tuned optics, and a combiner for providing an image to a user. Sensor modules 122, 124 and 126 can be mounted in a fixed position and orientation on an aircraft. Each sensor module 122, 124 and 126 may include a sensor computer for providing a special processing region within the imaging sensor field of view. Alternatively, the special processing may be carried out on display computer 106 or other processing devices. Infrared imaging sensor 124 provides an infrared image to HUD computer 106 via video interface 142 at input port 146. Further, display computer 106 can communicate over communication links 140, 142 and 144 to sensor input 121 for the purpose of providing command information to sensor modules 122, 124 and 126.

In addition to accepting input signals from sensor input 121, display computer 106 accepts a control signal 160 from adjustable interface 108. According to one exemplary embodiment, control signal 160 can indicate a level of display pixel intensity and display contrast desired by a user of system 100. According to one embodiment, display computer 106 accepts control signal 160 and selects one of several algorithms, relationships or equations stored in memory 127 to create a display content output signal 132 such as a video output signal. The video output signal can be associated with an enhanced vision application. Each algorithm stored in memory 127 can uniquely alter input from sensor input unit 102, such as video from camera input 140, into an output signal 132, such as a video output signal with altered pixel intensity and contrast characteristics.

Figure 2:
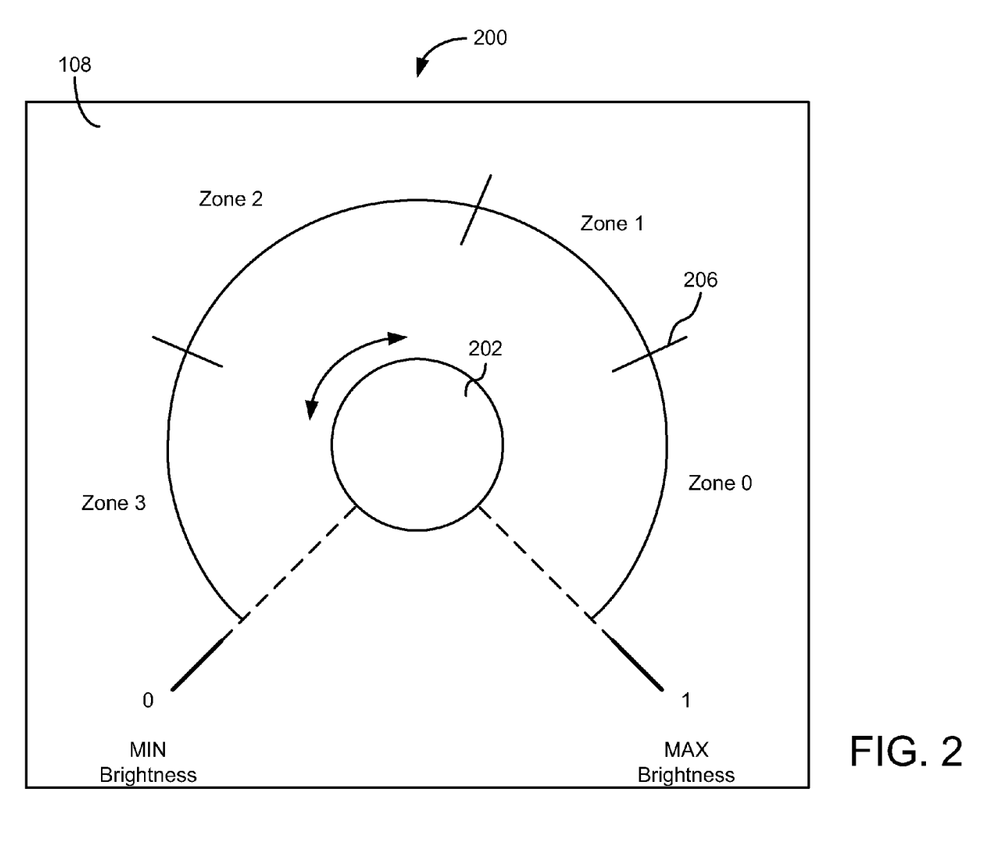
FIG. 2 is a general block diagram of an adjustable interface for the system illustrated in FIG. 1 in accordance with an exemplary embodiment.
Figure 3:
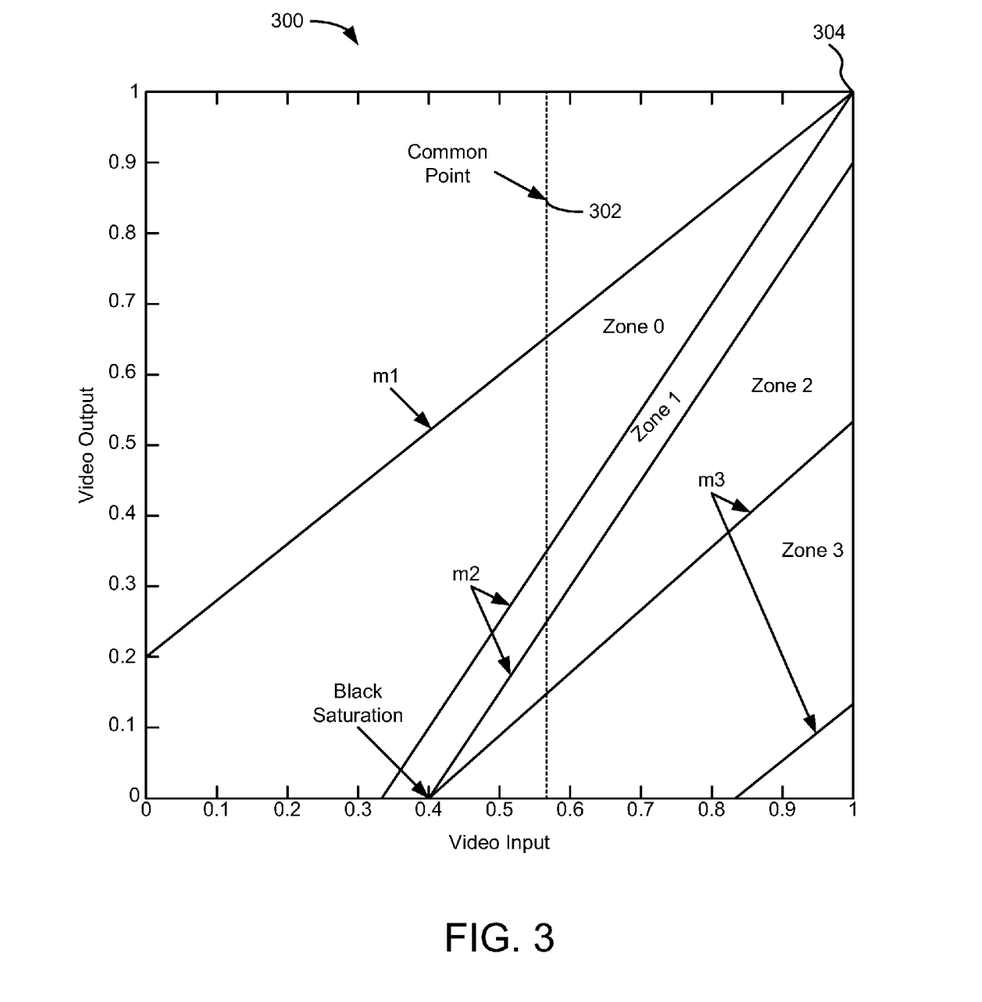
FIG. 3 is a graph depicting the relationship of normalized input pixel intensity levels to normalized output pixel intensity levels according to several selectable relationships in accordance with an exemplary embodiment.

For example, referring to FIG. 2, adjustable user interface 108 can be a dial, sliding mechanism, knob, button, or any other type of analog or digital user interface capable of producing a control signal 160 indicative of a desired level of brightness or contrast. Referring to FIG. 3, in one exemplary embodiment, adjustable interface 108 is a rotatable knob or dial 202 which is fully rotated at 1 for maximum display brightness and is at minimum rotation at 0 for minimum display brightness. Accordingly, the degree of rotation of dial 202 corresponds to a user's (e.g, pilot's) desired level of brightness for display system 100. For example, the degree of rotation of dial 202 can correspond to a degree of pixel intensity for an incoming frame of video. Specifically, a pixel may have a level of pixel intensity or brightness from 0-255. This range can be normalized to a set of values between 0 and 1 as shown on dial 108 in FIG. 2 and on the x axis labeled "video input brightness" as shown in FIG. 3.

With respect to FIG. 3, as stated previously, the x axis indicates a level of video input brightness from video signal 140. Video signal 140 may include a series of frames of video data 170, each of which are segregated into portions of data such as pixels 172. The x axis of FIG. 3 represents a level of pixel intensity for an individual pixel contained in a video frame 170 in signal 140. The y axis labeled "video output" represents the level of pixel intensity for an individual pixel contained in a video frame after being altered at display computer 106 by an algorithm selected by control signal 160. The level of brightness is shown in FIG. 3 on a normalized scale.

In one embodiment, zones 0-3 are defined by a set of linear equations having a slope varying between M1 and M2, a set of linear equations having a slope of M2, a set of linear equivalents having a slope varying from M2 to M3, and a set of linear equations having a slope of M3. Although four zones are shown, fewer or more zones can be utilized. Further, although linear equations are described herein, other mathematical relationships can be utilized including non-linear relationships. Equations can be chosen according to system parameters and design requirements for providing optimal contrast/brightness control for particular applications.

The sets of algorithms or lines in each of zones 0-3 can be a slope or other equation that define relationships between output pixel intensity and input pixel intensity. Although multiple lines are depicted at the same time in FIG. 3 for instructional purposes, only one line is selected at a time to determine the relationship between video input brightness and video output brightness in accordance with one embodiment.

The zones depicted in FIG. 3 may correspond to degrees of rotation on adjustable interface 108 labeled as zone 0-zone 3 as shown in FIG. 2. For example, if dial 202 has not been rotated and is at a level of 0, or minimum brightness, control signal 160 will be used to indicate to display computer 106 that the user has selected zone 3 for altering the level of brightness for the next available video frame in signal 140. In this same manner, if dial 202 is fully rotated to 1 or maximum brightness, control signal will indicate zone 0 is selected.

Once a particular degree of rotation is selected at adjustable interface 108, control signal 160 selects a particular zone, zone 0-zone 3 for example, defined by lines m1-m3. As can be seen in one exemplary embodiment shown in FIG. 3, each algorithm m1-m3 is a linear equation and may be expressed in the form of equation (1) below:

$$y = mx + b, \quad (1)$$

where y is the output pixel intensity level; x is the input pixel intensity level; $m_n$ is the slope for algorithms or equations m1-m3 (n=1 to 3 in one embodiment) which constitutes a level of contrast of the video content; and b is the point at which the algorithm crosses the y axis which constitutes a level of video output brightness.

Referring to FIG. 2, when dial 202 is rotated within a particular zone, the relationship between video input pixel intensity and video output pixel intensity is altered according to a different algorithm or line equation within that zone. The manner in which a precise line equation is selected will be different in each zone according to the exemplary embodiment shown in FIG. 3. For example, when dial 202 is at maximum brightness or 1, the relationship between video input pixel intensity and video output pixel intensity is altered according to line equation m1 of the form y=mx+b. However, if dial 202 is rotated within zone 0, between maximum brightness and marker 206, each selectable line equation will rotate about fixed point 304 until line equation m2 is selected. Accordingly, rotation of knob 202 within zone 0 selects line equations with varying contrast and pixel intensity as both slope m and brightness b are altered for each selectable line equation within zone 0. When line equation m2 is selected by rotating knob 202 to marker 206, the manner of selecting line equations changes because the zone has transitioned from zone 0 to zone 1.

In zone 1 as well as in zone 3, each selectable line equation varies in pixel intensity but not contrast as evidenced by the fact that slope m is constant at each boundary of zone 1 and zone 3 as shown in FIG. 3. Additionally, the manner of selecting line equations within zone 2, behaves similarly to zone 0 in that the selectable line equations vary in both contrast and pixel intensity. However, the manner of selection in zone 2 operates differently in that the selectable line equations rotate about a different common point, labeled "Black Saturation" rather than about point 304.

Once a zone and algorithm such as a line equation within a zone have been selected, an input pixel intensity level for a particular pixel in a video frame 170 is entered into the selected algorithm. Display computer 106 may use a look up table stored in memory 127 to select an output pixel intensity level according to input pixel intensity level and the selected algorithm. This process may be determined by a program stored in memory 127 and executed by processor 120. Alternatively, the output pixel intensity level can be calculated using the equations represented in FIG. 3. Referring to FIG. 3, for each video input, the selected algorithm will determine both an altered brightness and contrast with a single user input signal 160 from a single adjustable interface 108.

Figure 4:
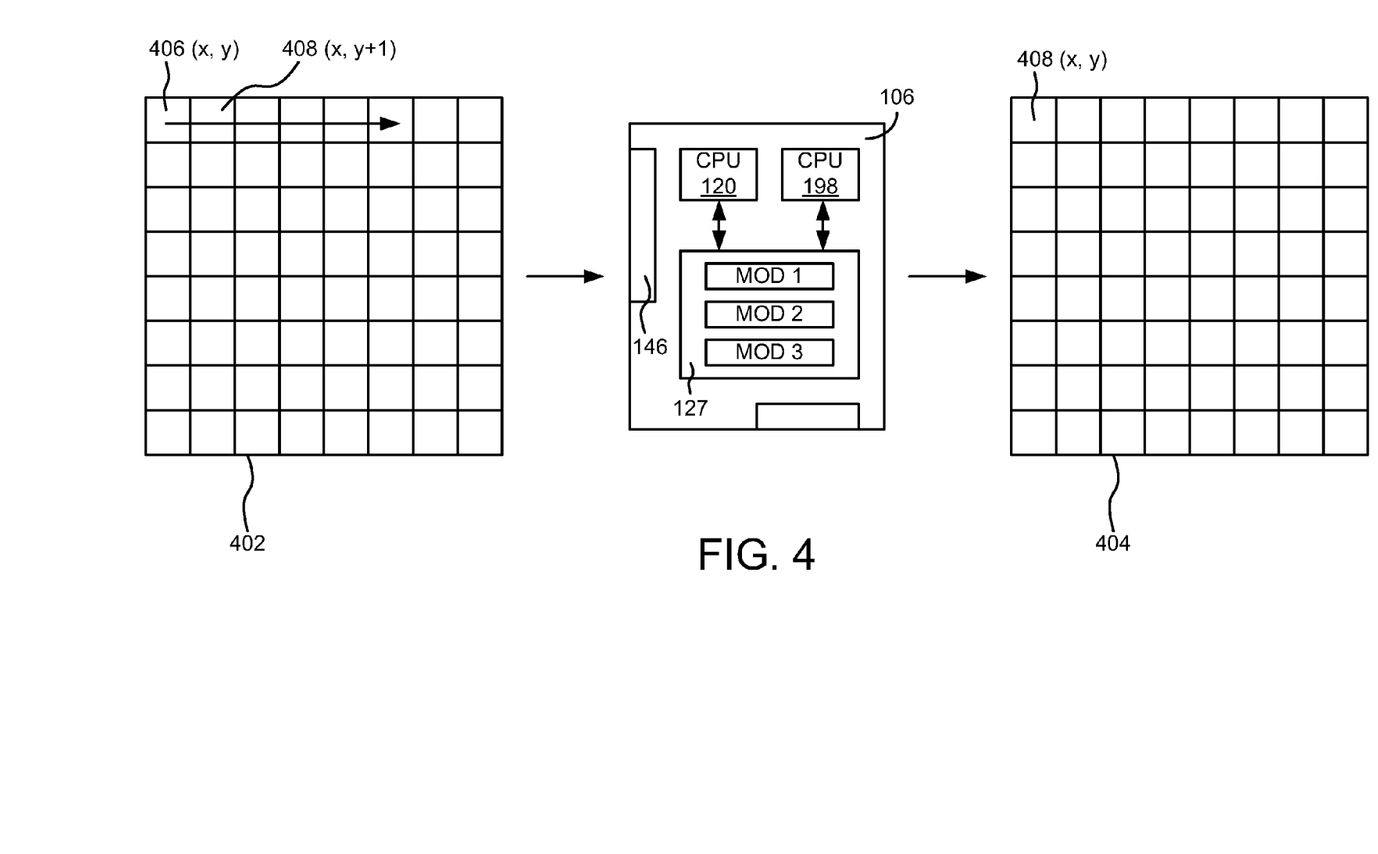
FIG. 4 is a schematic block diagram of a video frame divided into a number of pixels before alteration and after alteration according to one exemplary embodiment.

According to one example, referring to FIG. 4, if the pixel at position (0,0) 406 in input video frame 402 has a normalized pixel intensity of 0.4, the video output pixel intensity for that pixel at position (0,0) 408 would be increased to 0.5 in the video output frame 404, if dial 202 was rotated to mark 206, an input pixel with a normalized pixel intensity of 0.4 would have an output pixel intensity of 0.1. Furthermore, because of the differing slopes in each zone shown in FIG. 3, each zone has a different effect on pixel intensity and contrast. Furthermore, because of the differing slopes associated with the relationships in each zone shown in FIG. 3, each zone has a different effect on pixel intensity and contrast. For example, at the upper edge of zone 0, equation m1 has the lowest slope and therefore the lowest contrast of any other selectable setting whereas zone 1 has the highest slope with the highest contrast Accordingly, turning knob 202 to mark 206 on adjustable interface 108 adjusts contrast as well as brightness simultaneously.

According to one exemplary embodiment shown in FIG. 3, lines m1-m3 and zones 0-3 have been designed such that along the "common point" 302, each degree of rotation of knob 202 alters pixel intensity to a commensurate degree. For example, along the common point 302, a 1% rotation of knob 202 can result in a 1% change in pixel intensity for a given pixel. The common point 302 has been found to be at the center of usable input pixel intensity. Designing the algorithms and zones such that the degree of knob rotation is commensurate with the change of brightness at the common point 302 allows for a greater degree of intuitive control for a given user. In one embodiment, at a 0.58 video input pixel intensity, a 1% knob turn equals a 1% change in video brightness. However, in a portion of zone 3, a rotation of knob 202 will not increase pixel values in one embodiment. Preferably, the average scene will generally increase linearly with the turn of knob 202 in one embodiment. However, in zone 2 for example, if most of the scene is closer to 1, the average brightness will change more quickly in one embodiment.

Bright conditions such as runway lights can remain disproportionately bright in comparison with other surrounding terrain such as land and clouds so that pilots are able to distinguish objects of high importance. For example, in many cases, runway lights appear on video input between a pixel intensity of 0.8-1.0 of the full intensity range. Each zone in FIG. 3 including minimum brightness in zone 3 outputs some degree of video output brightness for video input pixel intensity of 0.85 and above. Furthermore, reducing the brightness associated with dial 202 1% within zone 0 for input pixel intensity levels of 0.8-1.0 lowers output pixel intensity less than 1% while changing input pixel intensity between 0% and 40% (dimmest input) lowers output pixel intensity greater than 1%.

Once the pixels in an input video frame 170 have been altered according to control signal 160 on a pixel by pixel basis at display computer 160, the output video signal 132 may be sent to display system 100 to be viewed by a user in one preferred embodiment. Output video signal 132 may optionally be sent through a HUD system before appearing on display system 100. Furthermore, output video signal may be preprocessed prior to display system 100 for signal conditioning, or other preprocessing that may be required at display computer 106. In addition, video output signal 132 may be by merged with independently generated symbology content generated at graphics engine 196 so that the final display content on display system 100 includes both output video content 114 and symbology content 112. For example, referring to FIG. 1, symbology content 112 which may include altitude, flight speed, navigation information or other aircraft data 190 can be superimposed over the video output content 114 which may include video captured from an infrared or other camera mounted on the exterior of the aircraft. In FIG. 1, the video output content 114 includes a video frame depicting mountainous terrain detected from camera 122 at sensor input 102 according to one embodiment.

Referring again to FIG. 1, symbology content 112 is generated in response to aircraft data 112. In accordance with alternative embodiments, aircraft data 112 may include but is not limited to any variety of sensor signals including the position of aerodynamic control surfaces, environmental variables affecting the flight of the aircraft, and/or the operating conditions and status of the pilot's controls. Analog data are converted into digital signals by analog-to-digital converters either included in or outside of symbol generator 194. When receiving aircraft data, symbol generator 194 creates a display list containing drawing instructions for the graphics engine 196. Symbol generator 194 places instructions in a display list to locate the symbol in the correct X and Y position of display system 100. Once the location and type of symbol to be drawn on the pixilated display have been determined, the resultant symbology can be sent to display computer 106 to be merged with the altered video input signal to create video output signal 132 as display content on display 110.

Because the content of symbology and video content are independently generated, two different processes govern the degree of pixel intensity chosen for each component. Symbology pixel intensity is conventionally drawn at graphics engine 196 at maximum intensity for all symbology pixels drawn at maximum pixel intensity or maximum apparent pixel intensity.

Figure 5A:
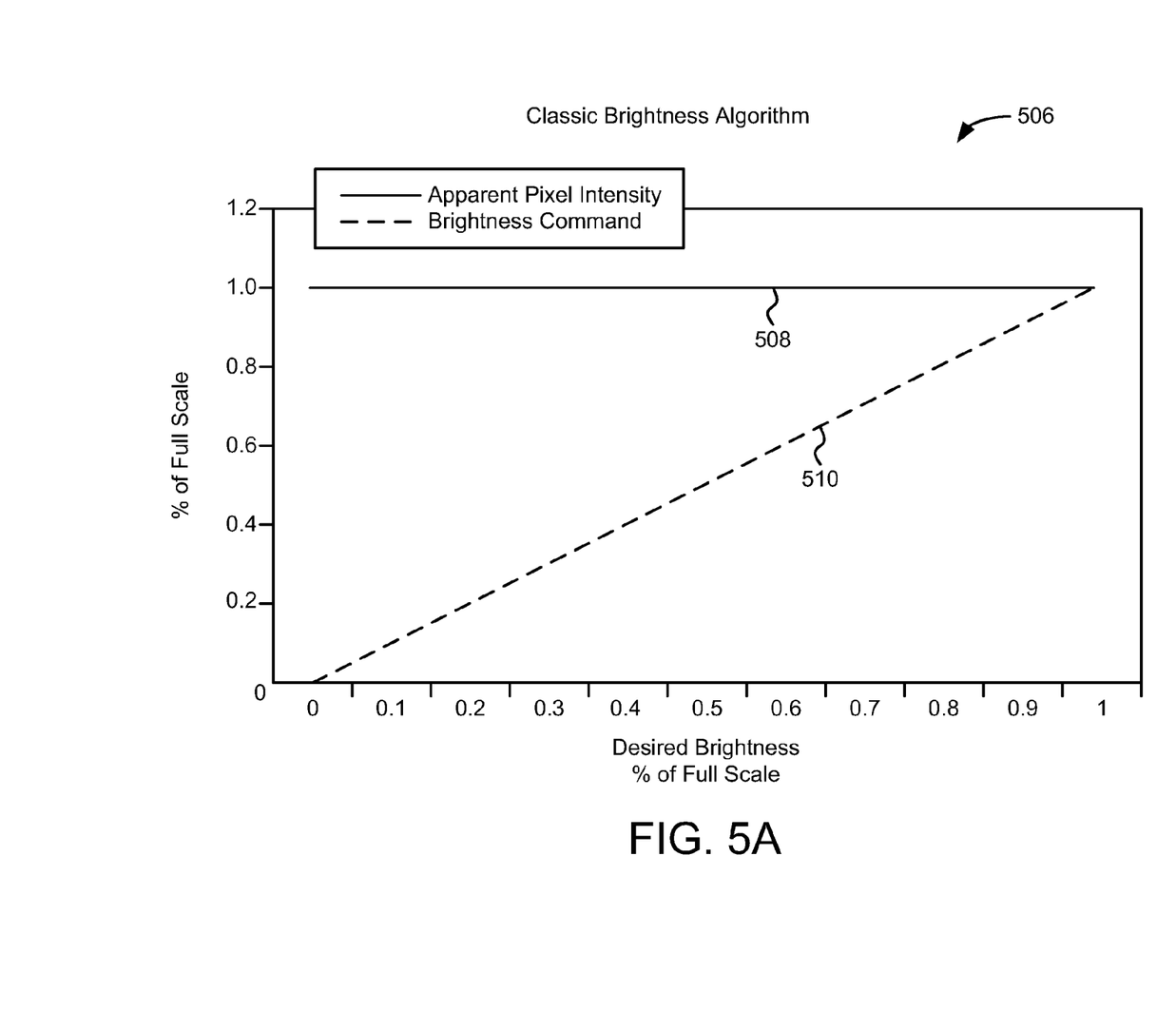
FIG. 5A is a chart depicting the relationship between symbology apparent pixel intensity and desired brightness according to one exemplary embodiment.

A brightness algorithm is shown in FIG. 5A. As seen in FIG. 5A, a brightness command 510 has no affect on the apparent pixel intensity (API) 508 of symbology 114 in one embodiment. Brightness command 510 as described herein accepts input from adjustable interface 108 and from an ambient light sensor 126, which may be located at sensor input 144 and produces brightness command signal 180 at display computer 106. The brightness command signal may be sent to graphics engine 196 or may be used to alter the input from graphics engine 196 at display computer 106. Because symbology is typically drawn at 100% of full pixel intensity, conventional display systems can only vary the apparent pixel intensity as shown on display 110 by varying the brightness of the display backlight.

Figure 5B:
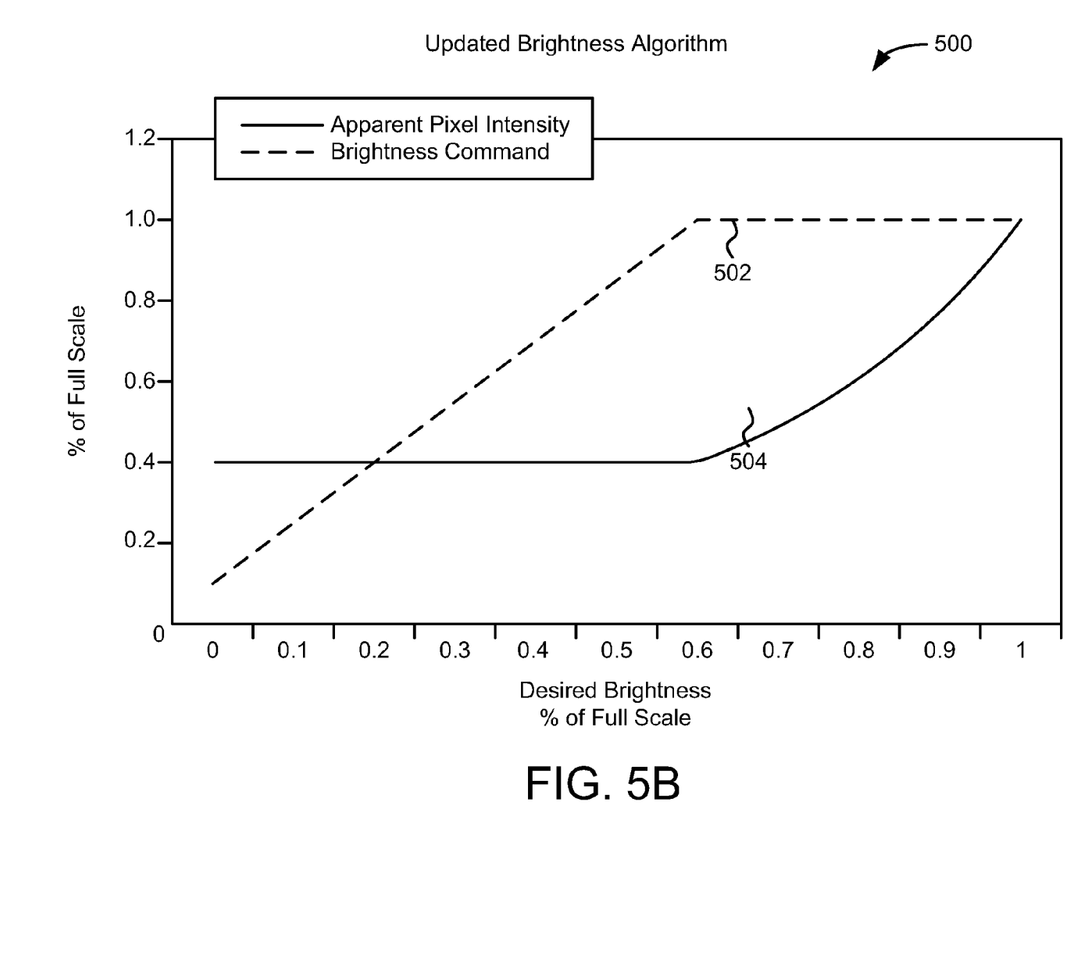
FIG. 5B is an exemplary embodiment depicting the relationship between symbology apparent pixel intensity and desired brightness according to another exemplary embodiment.

Although altering the backlighting of display system 100 does vary the level of brightness for symbology 112, varying the backlighting also effects the level brightness for video content 114 in the same way. In some instances, it may be advantageous to alter brightness of symbology 114 and video content 112 in divergent manners. For example, pilots may need to clearly view video content such as runway lights so that symbology brightness does not overwhelm it. Referring to FIG. 5B, apparent pixel intensity 502 varies with respect to brightness command 504. Command 504 can have slightly logarithmic portions. Because symbology pixel intensity is capable of being drawn at less than 100% pixel intensity, video pixel intensity is capable of being brighter than symbology pixel intensity. Furthermore, according to one exemplary embodiment, because the updated brightness algorithm (UBA) is most beneficial when symbology 112 is merged with video content 114, the UBA is only used when both symbology 112 and video content are merged. If symbology 112 alone is present on display 110, the classic brightness algorithm (CBA) may be used instead to maximize display line quality.

In many cases, symbology 112 is a single color such as green or blue. If the symbology is chosen to be displayed in green, pixel intensity of symbology is modulated by varying the green value from 0-255 in the symbol definition at symbol generator 194. The apparent pixel intensity will be converted to the actual green intensity by applying an approximated inverse gamma function. In the case of an LCD display, the gamma is the AMLCD gamma.

Figure 6:
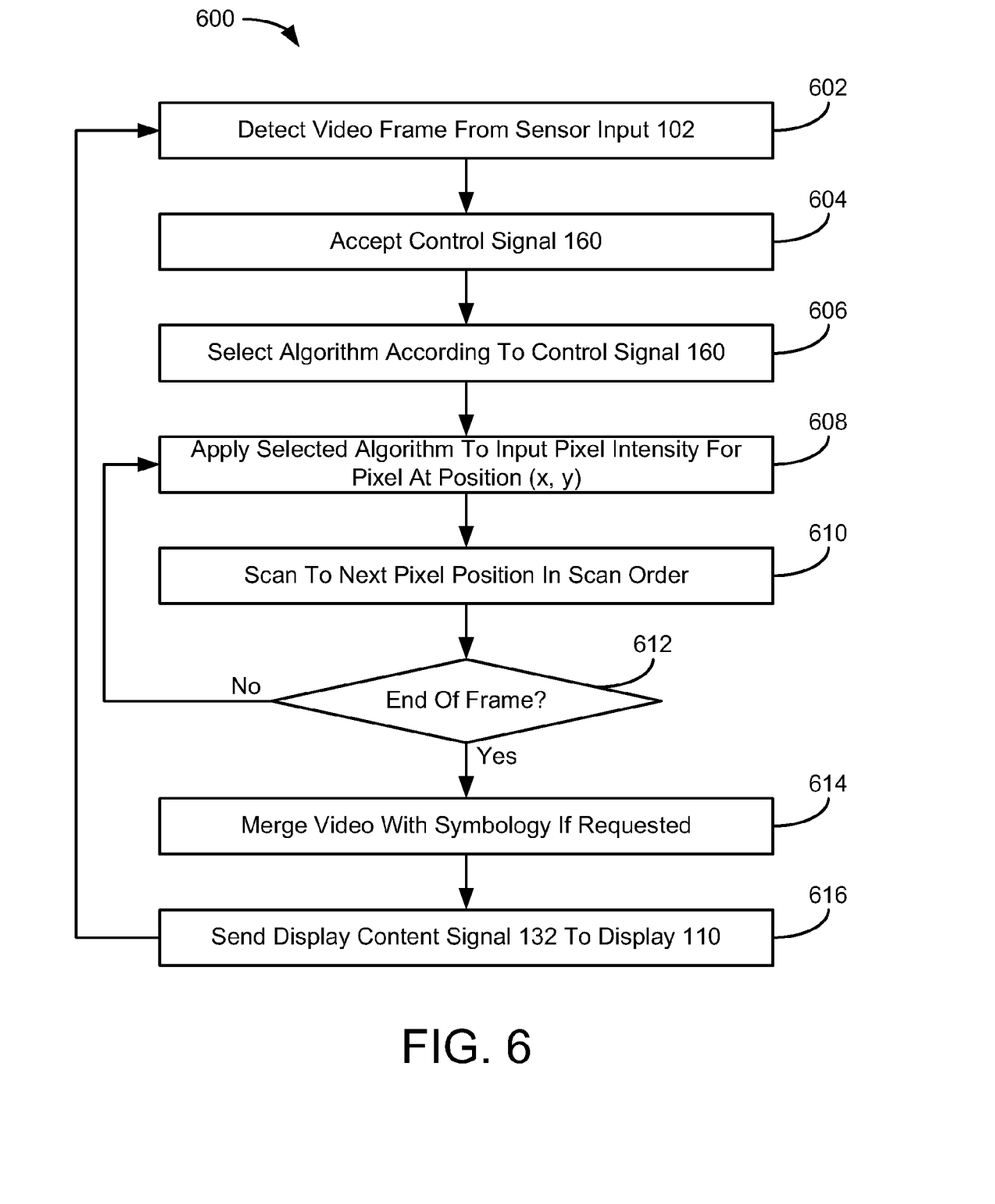
FIG. 6 is a flow chart of brightness an contrast control procedures according to one exemplary embodiment.
Figure 7:
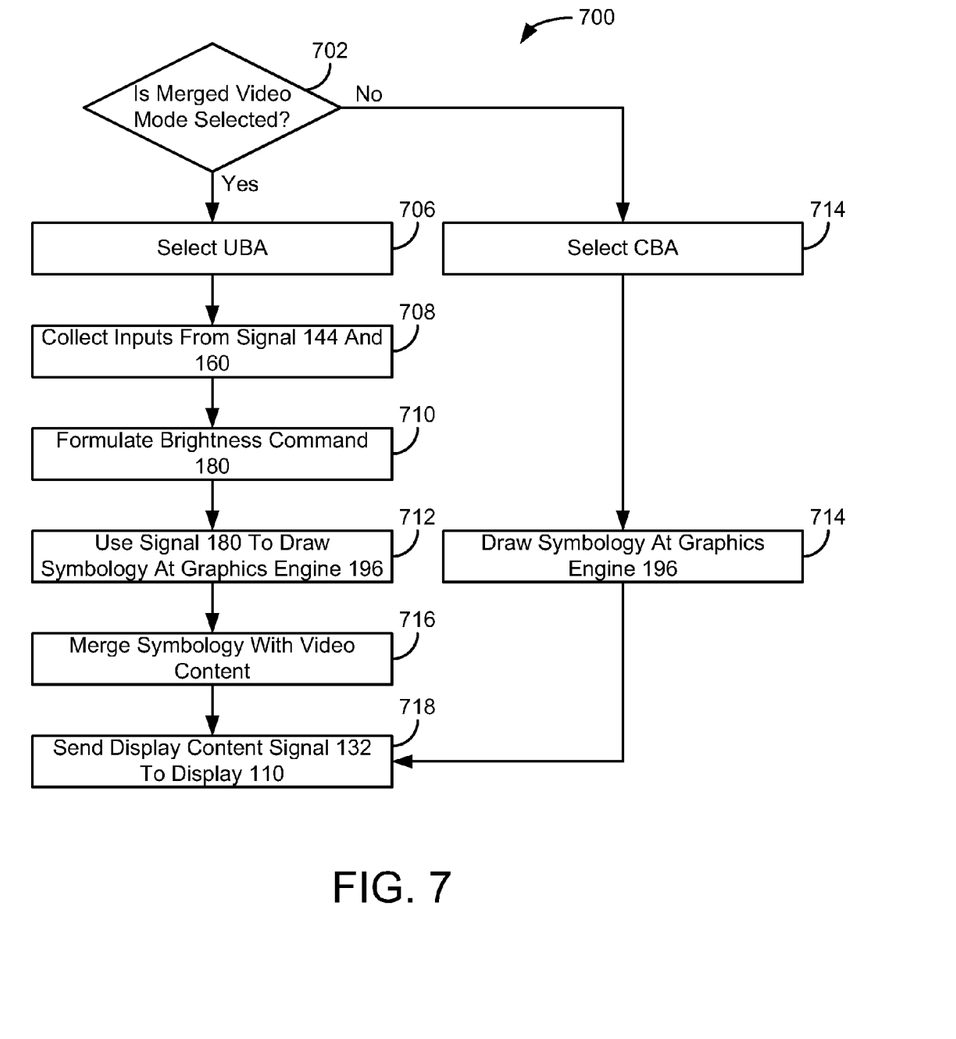
FIG. 7 is a flow chart of symbology pixel intensity control procedures according to one exemplary embodiment.

Referring to FIGS. 6 and 7, aspects of embodiments of the disclosed system and method are shown in high level flow charts. FIG. 6 depicts a method of altering video content pixel intensity according to one exemplary embodiment. FIG. 7 depicts a method of altering symbology pixel intensity according to one exemplary embodiment. Both process 600 and process 700 may be a set of instructions stored in the same or separate modules of memory 127 and executed by processors 120 and/or 198. With respect to FIG. 6, at step 602, an incoming video frame 170 can be received from camera 122 or from an infrared sensor or camera 124 at display computer 106. At step 604, display computer 106 also received control signal 160 from adjustable interface 108 operated by a user. Once control signal 160 is received at display computer 106, the control signal is then used to select one of several algorithms or equations stored in memory 127 at step 606 to create a display content output signal 132 such as a video output signal.

According to one exemplary embodiment, the selectable algorithms may include linear equations m1-m3 shown in FIG. 3 which are of the general form indicated in equation (1). The algorithms may be selected by a user operating dial 202 shown in FIG. 2. Once an algorithm is selected, input pixel intensity values from a video frame are altered according to the selected algorithm on a pixel by pixel basis as step 606. FIG. 4 depicts current video frame 402. At step 606, a first pixel 406 in frame 402 is altered by the algorithm selected as step 606. At step 608, the selected algorithm is applied to the next pixel in a predetermined scan order such as pixel 408. The predetermined scan order can be any order such as raster scan order. The pixel by pixel intensity alteration continues for the entire frame 402 an end of frame block, flag or other indicator of the end of frame 402 is reached at step 610. At step 612, the video content with altered pixel intensity may optionally be merged with symbology if symbology is available at step 612. Following step 612, the final display content signal 132 is sent to display 110 and the process continues again for the following video frame at step 602.

With respect to FIG. 7, at initial step 702, process 700 determines whether display system 100 has been selected for merged video content and symbology content mode or if symbology alone will be displayed on display 100. If it is determined that only symbology will be displayed at step 702, then process 700 will select the classical brightness algorithm depicted in FIG. 5A at step 704 to determine the pixel intensity of symbology to be drawn at step 714. However, if it is determined at step 702 that symbology content and video content are going to be merged, the alternate updated brightness algorithm depicted in FIG. 5B is selected at step 706. Following step 706, process 700 collects at least signal inputs 144 and 160 to formulate the brightness command signal 180 depicted in FIG. 1. Once brightness command signal 180 is determined, the brightness command is used at graphics engine 196 to determine the level of API that symbology should be drawn at prior to being displayed on display 110.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of controlling display content on an electronic display, the method comprising:
   receiving a control signal from a user interface, the user interface includes a rotatable dial that produces the control signal;
   receiving an electronic video input signal having a first pixel intensity associated with a first pixel;
   providing an electronic video output signal having a second pixel intensity for the first pixel, wherein the second pixel intensity is provided according to a plurality of zones related to the control signal, the zones each having a different zone relationship between the first pixel intensity and the second pixel intensity, wherein each zone is defined by a set of linear equations relating the first pixel intensity to the second pixel intensity, wherein each of the plurality of zones are associated with at least one predetermined degree range of dial rotation of the rotatable dial of the user interface, and the second pixel intensity is provided in accordance with a zone relationship of a selected zone of the zones, the zone relationship of the selected zone defining the second pixel intensity with respect to the first pixel intensity and a position of the user interface associated with the control signal;
   generating symbology at a graphics engine, the symbology generated in response to aircraft data;
   displaying an image associated with the video output signal on the electric display; and
   overlaying the symbology on the image such that the symbology is displayed at a symbology pixel intensity that is calculated independent of the second pixel intensity of the electronic video output signal, wherein the symbology pixel intensity is a maximum pixel intensity or a maximum apparent pixel intensity.

2. The method of claim 1, wherein the electronic display is in a head up display (HUD) system and the control signal is received from a single user adjustable interface.

3. The method of claim 2, wherein each zone has at least one predetermined contrast level different than any other zone.

4. The method of claim 1, wherein a first zone of the plurality of zones is defined by two linear equations having different slope values.

5. The method of claim 2, wherein each zone in the plurality of zones includes a number of functions and each function within a particular zone varies by either pixel intensity or pixel intensity and contrast.

6. The method of claim 3, wherein for any pixel contained in the video input signal with a normalized pixel intensity above 0.85, an altered pixel intensity for each pixel is set to a normalized pixel intensity above zero for all zones.

7. The method of claim 1, wherein each of the zones is defined by a relationship where the second pixel intensity is equal to m multiplied by the first pixel intensity plus b.

8. The method of claim 3, wherein an infrared camera provides the video input signal, the video input signal comprises at least one video frame with a plurality of pixels, each having a particular input intensity, wherein the particular pixel intensity of each of a number of pixels is converted to an altered intensity on a pixel by pixel basis.

9. The method of claim 8, wherein the electronic display is a liquid crystal display.

10. The method of claim 5, wherein at a particular input pixel intensity, a first percentage corresponding to dial rotation will alter output pixel intensity by the first percentage in all zones.

11. The method of claim 1, wherein two modes determine display content such that under a first mode, the video output is merged with symbology and under a second mode the displayed video content is removed from the electronic display and only symbology is displayed.

12. The method of claim 11, wherein under the first mode apparent pixel intensity of the symbology is determined according to a first symbology algorithm and under the second mode the pixel intensity of the symbology is determined according to a second symbology algorithm.

13. The method of claim 12, wherein the second symbology algorithm supplies a brightness command to a graphics engine to determine the apparent pixel intensity of the symbology; and
   a desired brightness command is determined from inputs comprising the control signal from a user and a signal from an ambient light sensor.

14. The method of claim 13, wherein the apparent pixel intensity of the symbology is not increased until the brightness command reaches a maximum and once the brightness command reaches a maximum the apparent pixel intensity increases logarithmically.

15. The method of claim 12, wherein the second symbology algorithm allows the graphics engine to formulate symbology at apparent pixel intensities less than a maximum apparent pixel intensity and the first symbology algorithm does not allow the graphics engine to formulate symbology at pixel intensities less than a maximum apparent pixel intensity.

16. An apparatus for controlling display content, comprising:
   a sensor configured to detect video input;
   a single user adjustable interface configured to receive an input control signal, the single user interface includes a rotatable dial that produces the input control signal;

a plurality of different selectable linear algorithms that provide a formula for altering an input pixel intensity of video data received from the sensor to a second level of pixel intensity for output via a video output signal, wherein each of the plurality of different selectable linear algorithms is associated with at least one predetermined degree range of rotation of the rotatable dial, wherein one of the selectable linear algorithms is selected according to the input control signal to provide an altered level of pixel intensity for the video output signal, the altered level of pixel intensity being provided in response to one of the selected linear algorithms and according to the input pixel intensity; and a graphics engine configured to generate symbology independent of the video data and to overlay the symbology onto the video output signal such that the symbology is displayed at a symbology pixel intensity that is calculated independent of the second level of pixel intensity of the video output signal, wherein the symbology pixel intensity is a maximum pixel intensity or a maximum apparent pixel intensity.

17. The apparatus of claim 16, wherein the sensor is an infrared camera and the video input comprises at least one video frame with a plurality of pixels, each having the input pixel intensity, wherein the selected algorithm alters the input pixel intensity of each of the plurality of pixels into an altered output intensity on a pixel by pixel basis for each video frame.

18. A head-up display (HUD) or helmet mounted display (HMD) system, comprising:

a single user adjustable interface configured to output a control signal, the single user interface includes a rotatable dial that produces the control signal;

a processor configured to provide an adjusted pixel intensity for each of a plurality of pixels associated with a video input signal, the adjusted pixel intensity being provided in response to a zone relationship selected from amongst a plurality of selectable zone relationships associated with a zones, wherein each zone is defined by a set of linear equations relating an input pixel intensity to an output pixel intensity, each of the plurality of zones being selected in response to the control signal, wherein each of the plurality of zones are associated with at least one predetermined degree range of dial rotation of the rotatable dial, wherein each of the selectable zone relationships defining the adjusted pixel intensity in response to the input pixel intensity associated with the pixels associated with the video input signal and a position of the user adjustable interface associated with the control signal; and a graphics engine configured to generate symbology independent of the video input signal and to overlay the symbology onto a video output signal such that the symbology is displayed at a symbology pixel intensity that is calculated independent of the output pixel intensity of the video output signal, wherein the symbology pixel intensity is a maximum pixel intensity or a maximum apparent pixel intensity.

* * * * *